March 5, 1940.  L. W. HILLS  2,192,441
VALVE STRUCTURE
Original Filed Oct. 2, 1936   4 Sheets-Sheet 4

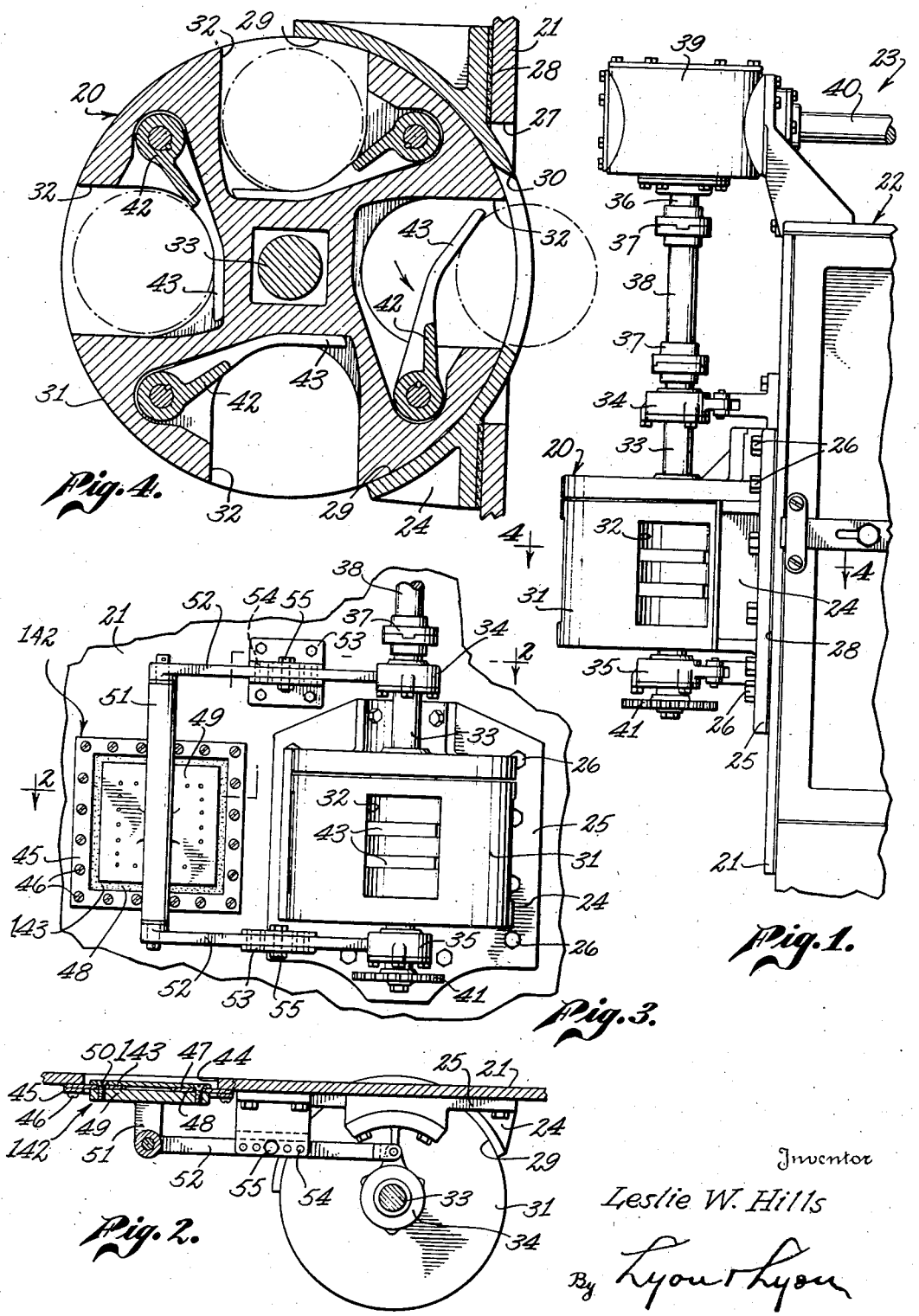

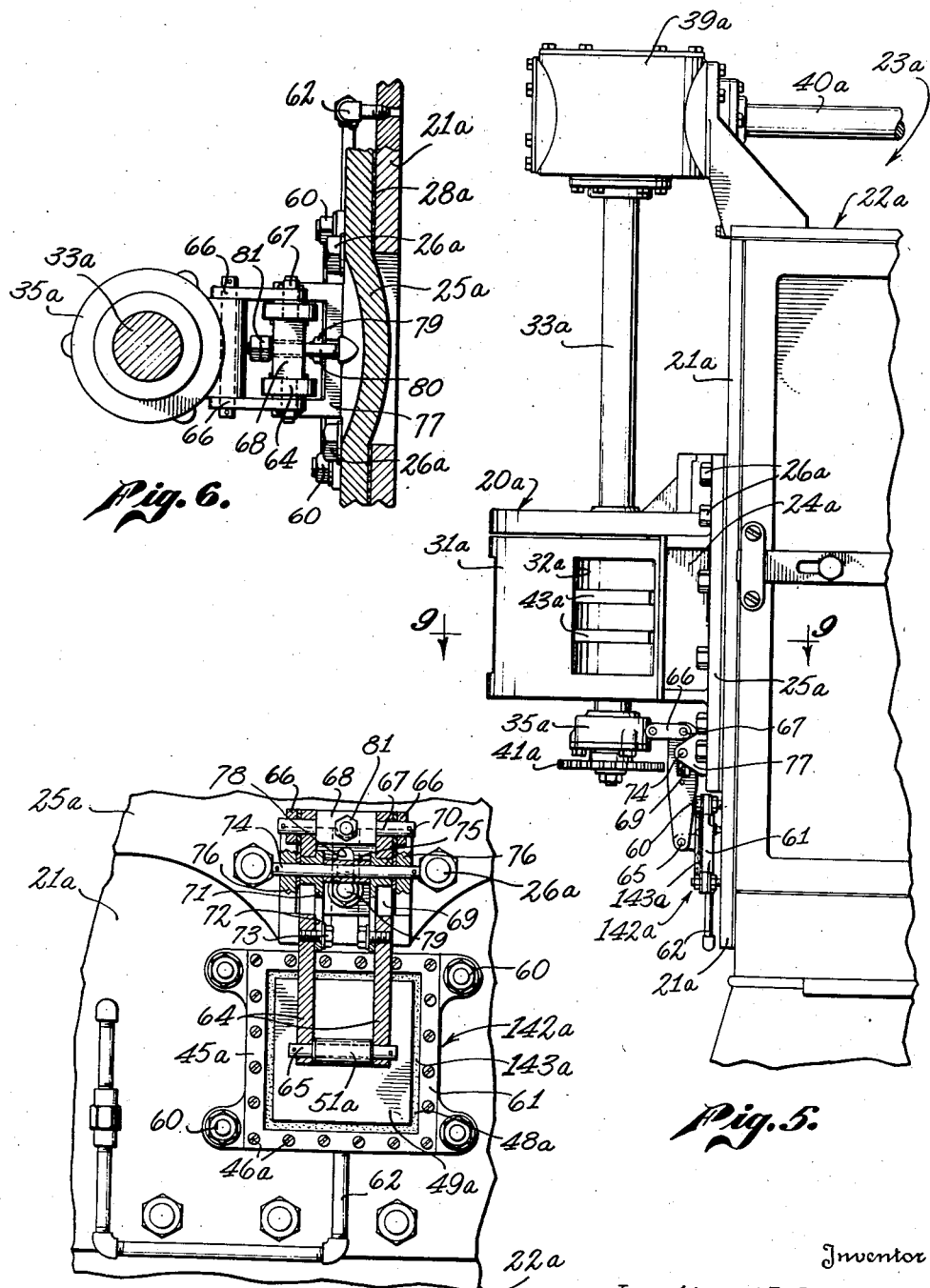

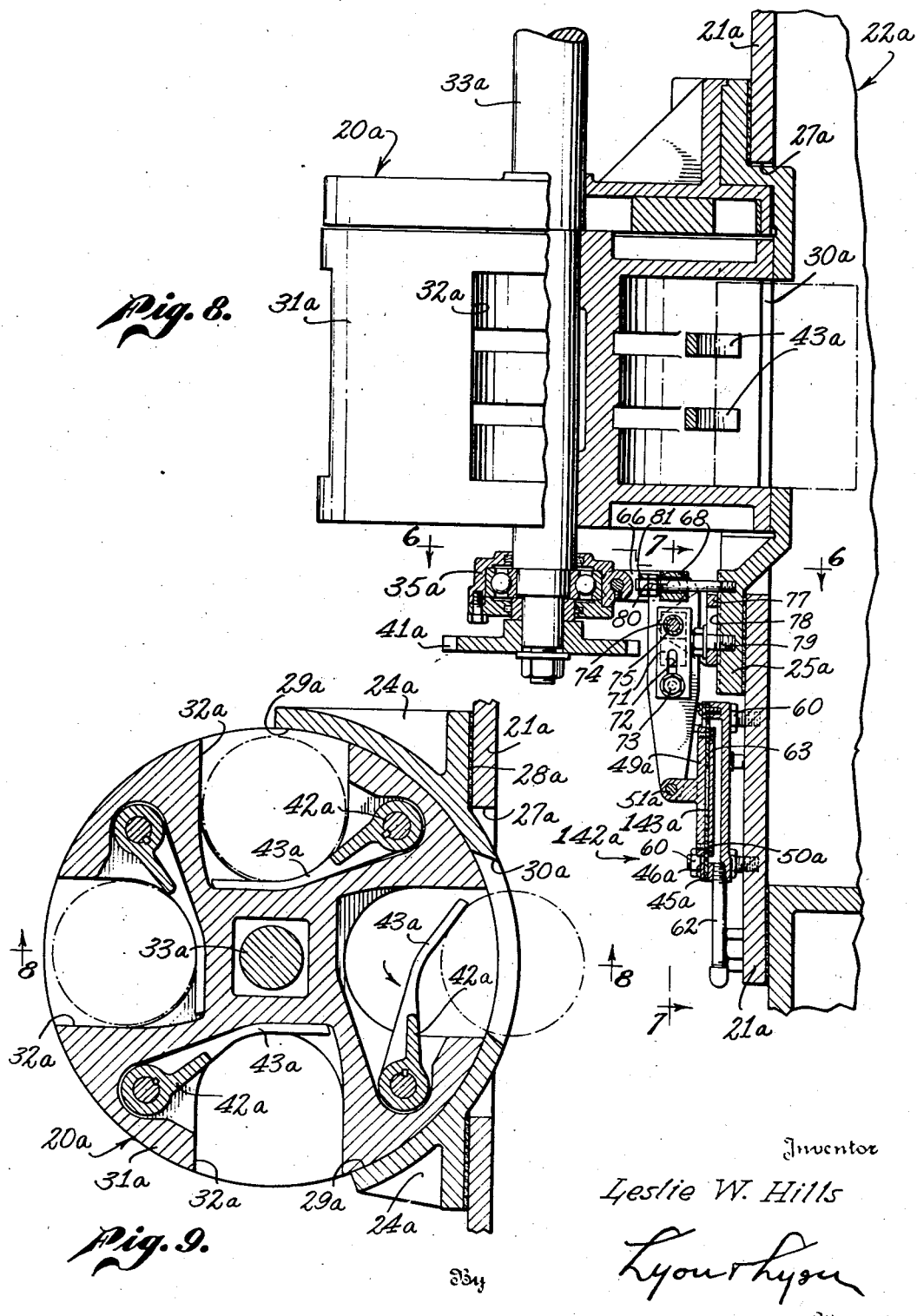

Inventor
Leslie W. Hills
Lyon Lyon
Attorneys

Patented Mar. 5, 1940

2,192,441

UNITED STATES PATENT OFFICE 2,192,441

VALVE STRUCTURE

Leslie W. Hills, San Francisco, Calif., assignor to Hills Bros. Coffee, Inc., a corporation of California Application October 2, 1936, Serial No. 103,664
Renewed August 7, 1939

7 Claims. (Cl. 198—209)

This invention relates to a valve structure applicable for conveying objects from an area of one pressure to an area of a second pressure, with the least possible leakage of the pressure fluid from the one said area to the second, and especially to means for counter-balancing the unbalanced pressure forces acting against the active member of said valve structure.

One of the principal objects of this invention is to provide means for counter-balancing the unbalanced forces acting against the active member of a valve structure, and to thereby eliminate the usual power absorbing and destructive thrust of this member against its seat. By the elimination of this thrust, valve structures which heretofore have proven impractical may now be used successfully, and excessive wear and cutting of the valve and its seat is thereby eliminated, thus materially extending the useful life of the structure, and also of equal importance is the great reduction in power required to actuate this counter-balanced valve.

A further object is to provide a counter-balancing means for the valve member responsive to the difference in pressures acting thereagainst, whereby the counter-balancing effect will be proportional to the unbalanced forces acting upon said member.

A further object is to provide means operatively responsive to the difference in pressures acting upon the valve member for counter-balancing the unbalanced forces acting upon said member.

The counter-balancing means may be arranged to fully counter-balance the unbalanced forces acting against the valve member, and in some cases this may be highly desirable. However, in the present case, the counter-balancing means is arranged to counter-balance only the excessive unbalanced forces whereby the valve is left sufficiently unbalanced to maintain it tightly sealed against its seat.

A further object is to arrange counter-balancing means whereby the amount of counter-balancing effect may be easily adjusted.

A further object is to provide means for mounting the valve member to provide sufficient freedom of movement of said member to enable the unbalanced forces acting thereagainst to hold the valve tightly seated against its seat member.

A further object is to provide a variable counter-balancing means for counter-balancing the unbalanced forces due to the different pressures acting upon the valve, as these forces are increased and decreased by the pockets of said valve moving into communication with one and then the other of said pressures.

A further object is to provide pressure responsive means for automatically bringing the variable counter-balancing means into action as one pressure acting upon one portion of the valve exceeds another pressure acting upon a second portion thereof, an extent to which said counter-balancing means is brought into action depending upon the degree of difference between said pressures.

A further object is to provide a counter-balancing means which may be readily applied to many different types and kinds of valves, which will be simple in construction and positive in action.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification, and that variations therefrom in details of construction or arrangement of parts, may accordingly be effected and yet remain within the spirit and scope of the invention as the same is set forth in the appended claims.

In the drawings:

Figure 1 illustrates a side elevation view of a valve structure provided with the counter-balancing means of this invention as applied to the pressure chamber of a vacuum packing machine. In this figure the pressure chamber is only partially shown.

Figure 2 illustrates a fragmental sectional view taken substantially in the plane of line 2—2 of Figure 3.

Figure 3 illustrates a side view of Figure 1, showing the valve and counter-balancing means mounted upon the side of the pressure chamber, only a small portion of the pressure chamber being shown.

Figure 4 is a fragmental sectional view taken substantially in the plane of line 4—4 of Figure 1.

Figure 5 illustrates a modified arrangement of the valve and counter-balancing means.

Figure 6 illustrates a sectional view taken substantially in the plane of line 6—6 of Figure 8.

Figure 7 illustrates a fragmental sectional view taken substantially in the plane of line 7—7 of Figure 8.

Figure 8 illustrates a partially sectionalized view taken in the plane of line 8—8 of Figure 9.

Figure 9 illustrates an enlarged sectional view taken substantially in the plane of line 9—9 of Figure 5.

Figure 12:
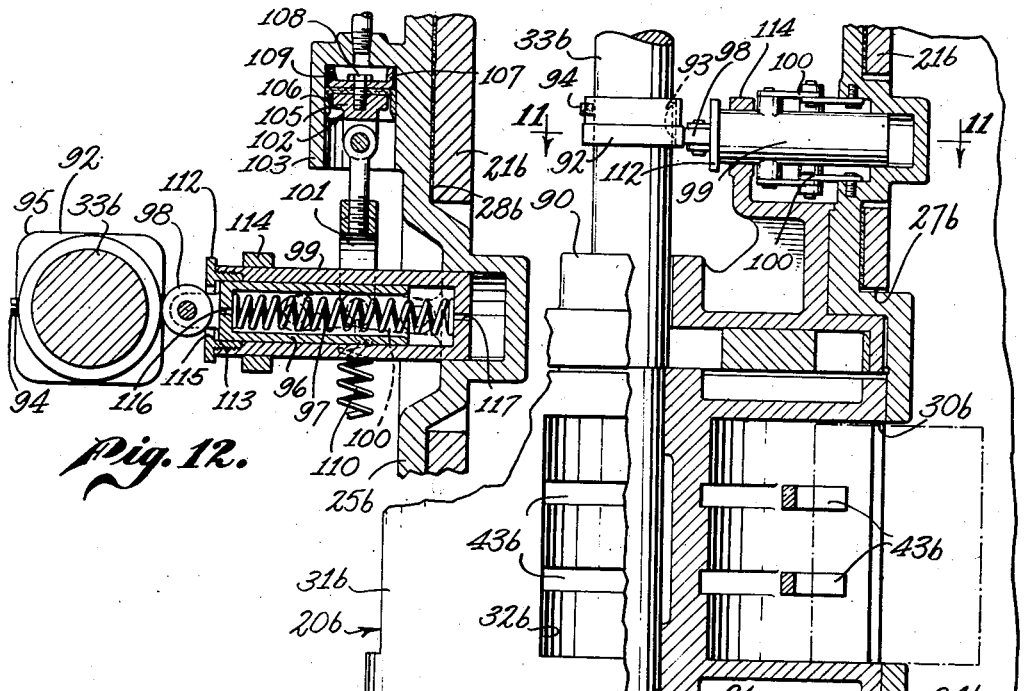
Figure 12 illustrates an enlarged fragmental sectional view taken in the same plane as Fig. 11 to more clearly show the operating mechanism.

For the purpose of illustration and description, the counter-balancing means of this invention has been applied to a rotary type of valve. It will be understood that the rotary type of valve may be used for feeding objects other than cans to or from a pressure treating chamber, and if preferred, a single valve may be used for feeding the cans into the treating chamber, and also for delivering the treated cans therefrom.

The preferred form of my invention is illustrated in Figures 1 to 4 inclusive, and is of the single purpose type, that is, one valve is used for feeding cans into the differential pressure chamber and a second valve for discharging the treated cans.

As both the inlet and discharge valves are alike, the inlet valve only has been shown, and the description for this valve will suffice for both.

In Figure 1 the valve structure 20 is shown mounted upon the inlet side plate 21 of pressure chamber 22 of the vacuum packing machine 23. As this invention is not concerned with the treatment given to the cans in the pressure chamber, the details of construction of the can sealing mechanism contained with the chamber, have not been shown.

The valve structure may include seat member 24 having flange 25 preferably formed integral therewith and securely fastened upon side plate 21 by suitable screw means 26. The side plate 21 is cut out as at 27 to receive the inwardly protruding portion of the valve member (Fig. 4), and gasket 28 is placed between the seat flange and side plate to form a pressure tight joint between these two parts. Facing outwardly from its mounting, flange member 24 is provided with a semi-cylindrical valve seat 29 (Fig. 4) having port means 30 extending therethrough and communicating with the interior of the pressure chamber through the cut-out portion 21 of the chamber side plate.

A cylindrical valve member 31 forms a rotatable pressure seal with seat 29, and is provided with four can pockets 32 (Fig. 4) each of which registers with the port 30 during the rotation of the valve member. A greater or lesser number of can pockets may be provided to suit the particular application of the valve.

An important feature of this invention is the free floating mounting of the valve member whereby it is free to rotate squarely upon its seat, and in this way to maintain a pressure tight seal with the seat member even after extensive use.

The valve member may be directly carried by a suitable floating bearing means, but I prefer to mount the valve member upon valve shaft 33, which in turn is journaled in the floating bearings 34 and 35. The valve shaft is flexibly connected to stub shaft 36 (Fig. 1) through a pair of universal joints 37 and connecting shaft 38. These universal joints may be of usual construction. The stub shaft 36 is journaled in gear box 39 and is driven through suitable gear means mounted in the gear box by drive shaft 40.

The lower end of valve shaft 33 is provided with sprocket 41 which, through suitable chain means, not shown, drives a can feeding conveyor (not shown) of usual construction for feeding cans to the valve pockets in timed relation with the operation of the valve.

Referring to Figure 1 and Figure 4, it may be observed that each can pocket is provided with an ejector hand 42 having spaced fingers 43, which are actuated to eject the cans as the pockets register with the valve port 30 for delivering the cans into the pressure chamber. The ejector actuating means has not been shown, as any of the well known means for this purpose as now used in can conveying turret heads and other similar devices may be readily used, and also as this means is not an element of my invention.

Rotary can feeding valves more or less of the type thus far described, have been tried without success. The reason for their failure lies in the terrific force with which the rotating member of the valve is thrust against its seat.

The thrust of the valve member against its seat is caused by the different pressures which act upon different portions of the valve, as for example, that portion of the valve directly in register with port 30 is subject to a high degree of vacuum, while the remaining portion of the valve is subject to atmospheric pressure, and as a result, the valve is unbalanced. This example may be more clearly demonstrated if all pressures are reduced to their approximate absolute equivalent values, in which case, the atmospheric pressure will be considered as 15 lbs./sq. inch and the high degree of vacuum as 5 lbs./sq. inch, thus establishing a pressure difference of 10 lbs./sq. inch. This pressure difference of 10 lbs./sq. inch multiplied by the area of the valve port 30, will give the minimum force thrusting the valve against its seat. The maximum thrust will be created when the next succeeding can pocket has turned to just open into communication with port 30, and this will take place before the preceding pocket will have opened to the relatively high atmospheric pressure, thus subjecting roughly one-third of the circumference of the valve to the relatively low pressure of the chamber, and this length of valve multiplied by the height of port 30, the can pockets being of substantially the same height, will give the total area subjected to the relatively low pressure, and by multiplying this area by the pressure difference of 10 lbs./sq. inch, the total force thrusting the valve against its seat may be obtained.

It will be understood that the relatively low pressure of 5 lbs./sq. inch has been taken merely for the purpose of illustration, and that the valve structure of this invention has been successfully operated when the pressure in chamber 22 was very much lower than the value above stated. Of course, any change in the pressures will correspondingly effect the pressure difference, and thus the thrust of the valve against its seat. With the increase in the pressure difference the thrust of the valve is greatly increased, and unless this thrust is counter-balanced to a considerable degree, the resultant friction of the valve while rotating upon its seat will cause, not only, the valve to wear out quickly, but will also require an excessive amount of power to operate it. When the valve is stationary this pressure difference will cause the valve to be forced against its seat with such pressure as to force the lubricating oil from between the bearing surfaces and to thereby permit these surfaces to move into substantial metal to metal contact so that when the valve is to be again started an excessive turning moment or torque will be required to, as it is commonly called, break the valve free.

To overcome the above mentioned difficulty, I have provided the valve with a counter-balancing means which exerts its counter-balancing force in direct proportion to the above mentioned difference between the relative high and low pressures.

In Figures 1 and 4, I have shown a preferred form of counter-balancing means for the rotary form of valve structure, and it will be appreciated that the specific structural application of this feature to the valve may be readily modified or changed to suit each particular application without materially effecting the important advantages resulting from its use.

Referring to Figures 1 and 4, the counter-balancing means may include a pressure responsive device 142 in the form of flexible diaphragm 143 overlapping all sides of opening 44 (Fig. 2) formed in side plate 21, and securely sealed thereto by means of frame 45 and screws 46. Due to this arrangement the inner side 47 of the diaphragm is subject to the relatively low pressure of the chamber, while its outer side 48 is subject to the relatively high pressure—in this instance, atmospheric pressure, whereby the diaphragm will flex or respond to the difference in pressures acting upon its opposite sides. It will be understood that the diaphragm may be in the form of a Sylphon bellows, or a cylinder and piston may be substituted. Therefore, the particular form or type of pressure responsive means is of no great moment. It is important, however, to provide a device which will respond to the difference in pressures acting upon the valve structure, and to use this responsive force for counter-balancing a portion or all of the unbalanced valve thrust.

The diaphragm 143 is preferably connected to the floating bearings 34 and 35 through some form of leverage system whereby the amount of counter-balancing effect may be adjusted by making appropriate adjustment to this system.

A simple and effective leverage system is shown in Figures 2 and 3, and may include clamping to the outer face 48 of the diaphragm, a bracket plate 49 by suitable screw means 50, and connecting the ends of bracket plate bearing 51 directly with the floating bearings by levers 52, and pivotally supporting these levers intermediate their ends in bearings 53, which bearings may be mounted upon side plate 21 or seat member 24 of the machine in any approved manner. The bearings and levers are preferably provided with a plurality of pivot holes 54 to enable pivot pins 55 to be positioned in any one of these holes, whereby the leverage of this system may be increased or decreased to correspondingly increase or decrease the counter-balancing effect transmitted through this system from the pressure responsive means to the floating bearings.

The opposed faces of the diaphragm are subject to the same pressures as the valve, and consequently the same pressure difference. If the same values are taken, as for the previous example, namely, 15 lbs./sq. inch for the relatively high pressure (atmospheric) and 5 lbs./sq. inch for the relatively low pressure maintained in the chamber, the same pressure difference of 10 lbs./sq. inch will be available for urging the diaphragm in the direction of the relatively low pressure. This pressure difference of 10 lbs./sq. inch acting upon the exposed area of the diaphragm will endeavor to move the diaphragm upwardly as viewed in Figure 2, but as the diaphragm is connected to the floating bearings through the leverage system, the diaphragm will be permitted to flex but slightly while transferring the force directly to the bearings. The direction of the thrust is reversed during its transmittal through the leverage system, and as a result, the floating bearings will receive the thrust in a direction tending to lift the valve member from its seat.

In the application of the valve structure to a vacuum packing machine, it is preferable to leave the valve sufficiently unbalanced to maintain it at all times during its normal operation in sealing relation with its seat, and therefore the counter-balancing means is proportioned and adjusted to counter-balance only the excessive unbalance of the valve.

If, in actual operation, the valve is found to be overbalanced or underbalanced to an excessive extent, this condition may be easily adjusted by moving pivot pins 55 into the proper pivot holes, and thereby increasing or decreasing the leverage of the leverage system until the proper condition of balance is obtained.

After the counter-balancing means has once been properly adjusted, it need not be readjusted for each change of pressures, as the valve and counter-balancing means are each directly effected to the same extent by this change, they will naturally maintain a substantially constant ratio of balance.

A counter-balanced valve structure of this type has proven very successful in actual operation for the feeding of cans to and from a vacuum packing machine.

A modified form of the invention is illustrated in Figures 5 to 9 inclusive. In this modification those parts which are similar to their corresponding parts found in the preferred form have been given the same number with the letter $a$ affixed thereto.

The principal difference between these two structures, lies in the mounting of the valve shaft and in the specific construction of the counter-balancing means.

Attention is directed to Figure 5 wherein the valve shaft 33a may be observed as a solid shaft extending from gear box 39a to and through the valve member 31a. The shaft is journaled at its upper end in the gear box, and at its lower end in the floating bearing 35a.

The length of shaft from its gear box bearing to the valve, permits of sufficient flexibility to enable the valve to seat tightly upon its seat member 24a.

The counter-balancing means includes a pressure responsive means 142a somewhat smaller than that of the preferred form, and therefore given a greater leverage ratio through its leverage system.

The pressure responsive means may be formed as a separate unit and mounted upon the machine by suitable screw means 60, and may include diaphragm 143a tightly clamped upon the outer edge of a shallow box-like casing 61, preferably formed of a casting, by frame 45a and screw means 46a. The interior of casing 61 communicates with the interior of the pressure chamber through any suitable arrangement of piping 62 (Figs. 7 and 8). Bracket plate 49a is securely clamped to the outboard face of diaphragm 143a by means of clamp plate 63 and screws 50a and is provided with bearing 51a.

Through a leverage system, bearing 51a is connected to the housing of the floating bearing 35a. This leverage system may include a pair of spaced levers 64 pivotally connected at one end to opposite sides of bearing 51a by pivot pin 65, and at their opposite ends to links 66. The pivot pin 67, which connects the levers with the links, has a square section 68 (Fig. 8) extending between the inner surfaces of the levers and acts not only as a spacer for the levers, but also as one portion of a stop means later to be described.

The opposite ends of links 66 are pivotally connected to the floating bearing housing. The upper end of each lever adjacent its pivotal connection with its respective link 66 is provided with a rectangular slot 69, and snugly fitting each lever slot is an adjustable pivot bearing 70. Each of these bearings is provided with a flange 71 slotted as at 72 to receive screw 73 for securely clamping each of these bearings to its related lever. The pivotal center of the levers may be adjusted by loosening screws 73 and sliding the bearings to the selected location, and then by tightening the screws securely clamping the bearings in their newly adjusted position.

A pivot pin 74 extends through bearings 70, and carries between the bearings a spacer member 75, and at its ends is journaled in the spaced bearings 76 of an adjustable bearing bracket 77. When the lever pivot bearings 70 are moved to a new position to adjust their leverage ratio, it is also necessary to move the bearing bracket 77 to the same extent, and for this purpose bracket 77 is provided with an adjusting slot 78 through which the clamping screw 79 extends.

When the leverage ratio of the levers is to be changed, screws 73 and 79 are loosened, thus freeing the lever pivot bearings 70 and bearing bracket 77 for movement. As these parts are connected together by pivot pin 74, they will move as a unit and may be securely clamped at their new location by means of screws 73 and 79.

It is desirable to provide means for limiting the outward movement of the floating bearing 35a in case something should happen either to the pressure responsive means or the valve member. A simple and effective form of stop means may be provided by passing stop stud 80 freely through the square section of pivot pin 67, and threading one end of this stud into seat member flange 25a, and providing its other end with a pair of lock nuts 81. The lock nuts are preferably locked upon the stop stud just clear of the adjacent face of the square section 68, so as not to interfere with the normal action of the counter-balancing means, but to prevent unnecessary outward movement of the floating bearing should some unexpected condition arise.

This form of counter-balancing means will act in substantially the same manner as the preferred form in counter-balancing the excessive unbalanced forces acting upon the valve.

Figure 10:
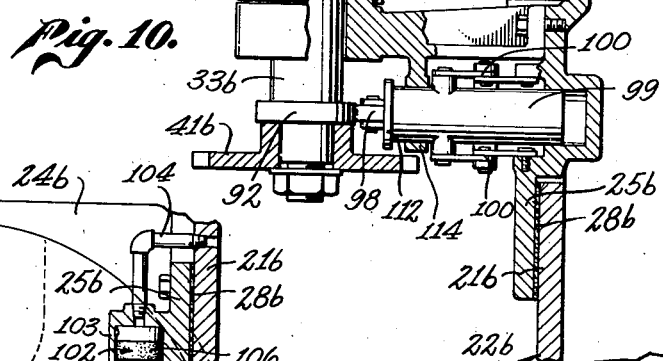
Figure 10 illustrates a view similar to that of Figure 8, showing a modified form of counterbalancing means.
Figure 11:
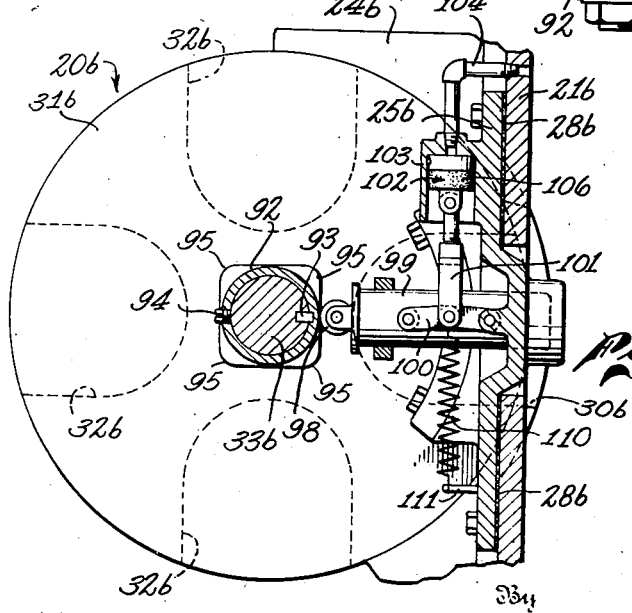
Figure 11 is a sectional view taken substantially in the plane of line 11—11 of Figure 10.

A further modification of my invention is shown in Figures 10, 11 and 12, wherein the parts corresponding to like parts of my preferred form, will be given the same reference numerals with the letter b added thereto. In this form the cylindrical valve 31b is securely fastened upon shaft 33b preferably connected to its driving means through a universal connection, not shown, whereby the valve is free to fit squarely upon its seat member 24b. As the valve is journally supported by means of its seat member, additional bearings may not be necessary. However, I prefer to provide bearings 90 having sufficient looseness so as not to interfere with the valve seating squarely upon member 24b, but operative for preventing the valve from leaving its seat more than a relatively short distance when the machine is not in operation, or from being thrown off its seat in case a can should jam between the valve and its seat, or on account of some other cause. In order to maintain the valve member in correct longitudinal alignment with its seat, thrust bearing 91 is provided between the lower end of the valve and the adjacent bearing 90.

The important feature of this form of the invention is the provision of a variable counterbalancing means operative for increasing and decreasing the counter-balancing effect as the thrust of the valve against its seat is increased and decreased as the can pockets 32b turn into communication with the relatively low pressure of chamber 22b. This increase and decrease of valve thrust is due to the increase and decrease of valve area subject to the relatively low pressure as, for example, as shown in Figures 4 and 11, one of the valve pockets is shown opposite the discharge port 30b of the valve seat, which port communicates with the relatively low pressure of chamber 22b, in this case, a relatively high vacuum.

Taking the figures used in my previous example, namely, 5 lbs./sq. inch for the relatively low pressure, and 15 lbs./sq. inch for the relatively high pressure, then the unbalanced force thrusting the valve against its seat will equal the area of port 30b multiplied by the difference between said pressures, namely, 10 lbs./sq. in. This will represent the minimum thrust. This thrust will increase as the pocket leaves port 30b, and the maximum thrust will be developed when the succeeding pocket turns into communication with the port, as this will take place just prior to the first mentioned pocket turning into communication with the relative high pressure. From this point the thrust will decrease until the minimum point is again reached. The reduction of the thrust is due to the first mentioned pocket turning into communication with the relatively high pressure, and the turning of the second mentioned pocket into register with the port.

From the above, it will be appreciated that the area of the valve subject to the relatively low pressure, varies from that represented by the area of port 30b to the area of substantially two pockets plus that of the port.

I have provided a simple and effective variable counter-balancing means for counter-balancing this variable thrust of the valve. I do not desire to fully counter-balance the thrust of the valve against its seat, as a certain amount of thrust is desirable for maintaining the valve in sealing engagement therewith. However, the thrust may be fully counter-balanced if desired.

The variable counter-balancing means may include providing appropriately shaped cams 92 either upon the valve or valve shaft. I prefer to mount the cams securely upon the shaft just above and below the valve by means of keys 93 and set screws 94 (Fig. 11). The cams are each provided with a node 95 for each valve pocket, and in Figure 11 one of the cams is shown as having four equally spaced nodes, and the position of these nodes is shown with relation to the location of the pockets. It may be observed that each node lies substantially centrally between two adjacent pockets. In this way, one of the nodes will point toward port 30b when the valve is subject to its maximum thrust, and whereby the low portion between a pair of nodes will be directed toward the port when the valve is subject to its minimum pressure.

Acting against each of the cams is a pressure exerting means including a plunger 96 (Fig. 12) thrust outwardly by spring 97, and thereby forcing its cam roller 98 against cam 92. As shown in Figure 12, spring 97 will exert its minimum thrust against the cam as its roller 98 engages one of the low sections of the cam, and as the pressure exerting means lies in substantially the same plane as the port, at this point, the valve also is being thrust against its seat by a minimum force; thus by selecting a spring of suitable strength, the proper degree of counter-balancing effect for the valve may be provided.

As the valve rotates and its thrust increases, the node turns under cam roller 98, thereby forcing plunger 96 to the right, as viewed in Figure 12, and thereby compressing spring 97; and as a result, increasing the counter-balancing effect of the device. This continues until the peak of the node rides under the roller, whereupon the spring is compressed to its maximum, and as a result, exerts its greatest counter-balancing effect, and it is at this position that the valve is also subject to its greatest thrust; thus the counter-balancing effect follows the change in thrust. By correctly shaping the nodes, and with the proper size and length of spring, the thrust may be proportionately counter-balanced from its minimum to its maximum. However, this degree of fineness is not necessary. As the cam turns further, the node turns from under the pressure exerting means, thereby reducing the counter-balancing effect, during which operation the thrust on the valve is also being reduced until finally the position of minimum thrust and counter-balancing effect is reached.

It is not necessary, but I prefer to provide means for removing the counter-balancing force when no pressure difference exists, such as may be the case when the machine is to be initially placed into operation, or shut down; and for this purpose I provide a pressure responsive means for automatically bringing the counter-balancing means into action, and spring means for returning it to its inactive position.

The control mechanism for the counter-balancing means may include slidably mounting plunger 96 in sleeve 99 in turn slidably mounted in the seat member, and connecting this sleeve to one end of a pair of interconnected toggle links 100. The opposite ends of the toggle links are connected to the seat member, and at their point of interconnection are connected to a yoke 101 pivotally connected to piston 102, which is slidably mounted in cylinder 103. The closed end of the cylinder may communicate with the interior of pressure chamber 22b by a suitable arrangement of piping 104.

Piston 102 is preferably formed of a plunger 105 to which cup leather 106 is securely clamped by cup-shaped member 107 and cap screw 108. The cup-shaped member also acts to stop further movement of the piston when it has acted to place the counter-balancing means in operation. A vent hole 109 is provided through member 107 for equalizing the pressure on opposite sides of its flange.

This pressure responsive means maintains the toggle links just above their normal center line (Fig. 11) whereby any inward thrust of sleeve 99 will act only to thrust the stop member 107 of the piston into closer contact with the cylinder head.

When the vacuum in chamber 22b is expended by the admission of atmospheric pressure, the pressure responsive means no longer will act to hold the counter-balancing means active, and as a result, these means are returned to their inactive positions by spring 110 having one end connected to the point of interconnection of the toggle links, and its other end connected to the seat member as by pin 111. The downward movement of the interconnected ends of the toggle links under the influence of spring 110, will cause sleeve 99 to be moved inwardly, that is, to the right as viewed in Figure 12, until the radial flange 112 of stop bushing 113 engages the sleeve bearing 114. The stop bushing is preferably threaded into the forward end of sleeve 99 and is provided with an inwardly directed flange 115 which, during the movement of sleeve 99 engages the forward end of plunger 96 to thereby move cam roller 98 out of engagement with cam 92. When flange 112 of the stop bushing engages bearing 114, further retracting movement of the counter-balancing means is halted, and in this position the parts remain until the vacuum is again built up in the pressure chamber, whereupon the pressure responsive means will function to return the counter-balancing means to operative position.

I find it preferable to so proportion the pressure responsive means to the strength of spring 110 as to bring the counter-balancing means into its fully active position considerably before the vacuum in the chamber has reached its maximum value. However, in some installations it may be advisable to proportion the pressure responsive and spring means to bring the counter-balancing means into its fully active position, as the difference between the pressures reaches substantially its maximum value, whereby for all other degrees of pressure difference a counter-balancing effect proportional thereto will be available for counter-balancing the excessive valve thrust.

Vents 116 and 117 drilled through the closed ends of the plunger and sleeve respectively, enable such air as may be trapped in the counter-balancing means to escape freely.

The invention has been described in its application to a vacuum packing machine, but it may be just as readily applied to a pressure cooker or any other device in which it may be desirable to transfer objects from one pressure area to another with the least possible leakage of pressure fluid.

The valve may be applied to a relatively high pressure chamber, such as a pressure cooker, in the manner herein set forth by arranging the counterbalancing means to overbalance the valve, whereby the valve will be operatively maintained upon its seat by the counterbalancing means and the thrust of the valve against its seat controlled thereby.

To apply the invention to a pressure cooker, for example, the valve and seat will be arranged within the high pressure chamber while its inlet or discharge port will communicate with the low pressure chamber. In such an installation the valve and seat will be mounted within the high pressure chamber so that the pressure difference will act to thrust the valve against its seat while the discharge port in such case may open to atmospheric pressure, or into a chamber having a pressure less than that of said high pressure chamber.

With my invention it matters not whether the pressure difference is of relative high order or not, as the valve will be counter-balanced in proportion to this difference.

Having fully described a preferred form of my invention, it is to be understood that it is not to be limited to the details herein set forth, but the invention is for the full scope of the appended claims.

I claim:

1. In a valve structure a valve seat subject to a relatively high pressure and having port means communicating with a source of relatively low pressure, a valve member for said seat having one or more pockets arranged to communicate with said port during the operation thereof, and a counter-balancing means for said valve member arranged to counterbalance the unbalanced forces due to said pressures acting on the valve as these forces are increased and decreased by the pocket or pockets moving into communication with one and then the other of said pressures.

2. In a valve structure a valve seat subject to a relatively high pressure and having port means communicating with a source of relatively low pressure, a valve member for said seat having one or more pockets arranged to communicate with said port during the operation thereof, a counterbalancing means for said valve actuatable from an inactive to an active condition and when in its active condition arranged to counterbalance the unbalanced forces due to said pressures acting on the valve as these forces are increased and decreased by the pocket or pockets moving into communication with one and then the other of said pressures, and pressure responsive means for actuating the counterbalancing means from its inactive to its active condition.

3. In a valve structure a valve seat subject to a relatively high pressure and having port means communicating with a source of relatively low pressure, a valve member for said seat having one or more pockets arranged to communicate with said port during the operation thereof, a counterbalancing means for said valve having active and inactive positions and when in its active position arranged to counterbalance the unbalanced forces due to said pressures acting on the valve as these forces are increased and decreased by the pocket or pockets moving into communication with one and then the other of said pressures, means for yieldingly urging the counterbalancing means into its inactive position, and pressure responsive means for retaining the counterbalancing means in its active position during the normal operation of the valve.

4. In a valve structure a valve seat subject to a relatively high pressure and having port means communicating with a source of relatively low pressure, a valve member for said seat having one or more pockets arranged to communicate with said port during the operation thereof, a counterbalancing means for said valve actuable from an inactive to an active condition and when in its active condition arranged to substantialy counterbalance the unbalanced forces due to said pressures acting on the valve as these forces are increased and decreased by the pocket or pockets moving into communication with one and then the other of said pressures, and pressure responsive means responsive to a predetermined difference in said pressures for actuating the counterbalancing means from its inactive to its active condition.

5. In a valve structure a valve seat subject to a relatively high pressure and having port means communicating with a source of relatively low pressure, a valve member for said seat having one or more pockets arranged to communicate with said port during the operation thereof, a counterbalancing cam for said valve member having a lift for each valve pocket, and a counterbalancing means cooperable with said cam for increasing the counterbalancing effect upon said valve as each pocket turns into communication with said port.

6. In a valve structure a valve seat subject to a relatively high pressure and having port means communicating with a source of relatively low pressure, a valve member for said seat having one or more pockets arranged to communicate with said port during the operation thereof, a counterbalancing cam for said valve member having a lift for each valve pocket, and a spring weighted counterbalancing means cooperable with said cam for increasing the counterbalancing effect upon said valve as each pocket turns into communication with said port.

7. In a valve structure a valve seat subject to a relatively high pressure and having port means communicating with a source of relatively low pressure, a valve member for said seat having one or more pockets arranged to communicate with said port during the operation thereof, a counterbalancing cam for said valve member having a lift for each valve pocket, a normally inactive counterbalancing means cooperable with said cam for increasing the counterbalancing effect upon said valve as each pocket moves into communication with said port, and pressure responsive means responsive to a predetermined difference in said pressures for rendering said counterbalancing means active.

LESLIE W. HILLS.